United States Patent
Godoy Varo (10) Patent No.: US 8,734,880 B2
(45) Date of Patent: May 27, 2014

(54) METHOD FOR CONTROLLING THE EVOLUTION OF AN ALCOHOLIC BEVERAGE IN A CONTAINER WITH A CLOSING STOPPER

(76) Inventor: Jose Luis Godoy Varo, Cassa de la Selva (ES)

( * ) Notice: Subject to any disclaimer, the term of this patent is extended or adjusted under 35 U.S.C. 154(b) by 108 days.

(21) Appl. No.: 13/378,944

(22) PCT Filed: Jun. 1, 2010

(86) PCT No.: PCT/IB2010/001307
§ 371 (c)(1),
(2), (4) Date: Dec. 16, 2011

(87) PCT Pub. No.: WO2011/007219
PCT Pub. Date: Jan. 20, 2011

(65) Prior Publication Data
US 2012/0088017 A1    Apr. 12, 2012

(30) Foreign Application Priority Data

Jun. 17, 2009    (ES) .................................. 200901438

(51) Int. Cl.
*B65B 31/02*    (2006.01)
(52) U.S. Cl.
USPC .................. 426/404; 426/330.4; 99/277.1
(58) Field of Classification Search
USPC ............... 426/404, 330.4; 99/271.1
See application file for complete search history.

(56) References Cited

U.S. PATENT DOCUMENTS

| | | | |
|---|---|---|---|
| 4,626,437 A * | 12/1986 | Schobinger et al. | 426/387 |
| 5,299,408 A * | 4/1994 | Dupont | 53/432 |
| 2005/0061393 A1 * | 3/2005 | Luis | 141/65 |
| 2008/0290062 A1 | 11/2008 | Luzaich et al. | |
| 2009/0038374 A1 * | 2/2009 | Broz | 73/23.37 |

FOREIGN PATENT DOCUMENTS

| | | |
|---|---|---|
| EP | 0 457 747 A1 | 11/1991 |
| EP | 2 119 497 A1 | 11/2009 |
| WO | WO 02/055397 A1 | 7/2002 |

OTHER PUBLICATIONS

Wines & Vines, Capsules in Transition, [on line] Mar. 2008, retrieved on Sep. 11, 2013. Retrieved from the Internet: URL:<http://www.winesandvines.com/template.cfm?section=features&content=53453>.*

* cited by examiner

*Primary Examiner* — Rena L Dye
*Assistant Examiner* — Chaim Smith
(74) *Attorney, Agent, or Firm* — Muncy, Geissler, Olds & Lowe, P.C.

(57) ABSTRACT

Method and installation for controlling the evolution of bottled wine closed with stoppers.

Applicable to an alcoholic beverage comprising wine and spirits comprising controlling a surrounding environment of a bottle or bottles containing said beverage, applying a pressure which follows any profile of values over time, with a value equal to, greater than or less than atmospheric pressure, inducing an interaction between the surrounding environment and the inside of the bottle.

An installation is used that comprises a sealed enclosure capable of storing bottles of said alcoholic beverage closed with caps, and a system controlling the pressure and composition of the atmosphere in the environment of the bottles in said tight enclosure.

16 Claims, 8 Drawing Sheets

Fig. 2 Group A

Fig. 3     Group B

Fig. 4.1  Grupo C

METHOD FOR CONTROLLING THE EVOLUTION OF AN ALCOHOLIC BEVERAGE IN A CONTAINER WITH A CLOSING STOPPER

FIELD OF THE ART

The present invention relates, in a first aspect, to a method for controlling the evolution of bottled wine, and bottled alcoholic beverages closed with stoppers, including in addition to wines, spirits in particular.

The method comprises applying a pressure, varying over the time its values in a controlled manner, in an environment of the bottle or bottles closed with a stopper, to cause pressure changes causing a controlled micro-oxygenation of the wine product or spirit product, referred to herein by its abbreviation CWMO (controlled wine micro-oxygenation).

A second aspect of the invention relates to an installation for controlling the evolution of bottled wine closed with stoppers, comprising a system for controlling the pressure in the environment of the bottles.

Any reference in this description to wine hereinafter must be understood as applicable to an alcoholic beverage, in particular a spirit, to which it has also been verified that the proposed method is applicable.

Likewise any reference to a controlled pressure should be understood as to the application of a pressure that follows any profiles of values over the time.

PRIOR STATE OF THE ART

There are currently different ways to control the evolution of stoppered wine, the most known one is perhaps the one used by the rooms of wine cellars, where the wine is left to stand in the bottle to refine its progress and flavour. This is possible mainly due to the use of natural stoppers which, since they have unique characteristics, allow the micro-oxygenation of the wine.

There are also on the market multiple cabinets for preserving wine, where temperatures and humidities are controlled in sections or globally, sometimes with combinations of changes of the inner air of the cabinet, by means of activated carbon filters.

A method controlling the evolution of stoppered wine consisting of pressurizing the stoppered bottles, in order to thus be able to control its evolution or micro-oxygenation, is currently not known, nor is there any method for causing negative pressures in stoppered bottles, in order to thus be able to strictly control the aging thereof.

There is also no method for introducing aromatic elements to the wine by means of a transmission of molecules of previously established essences.

DESCRIPTION OF THE INVENTION

It seems to be necessary to offer an alternative to the state of the art which covers the gaps found therein, in particular those relating to the lack of methods for controlling the evolution of bottled wine, closed with stoppers, which use pressurization as a control technique.

To that end, the present invention provides, in a first aspect, a method for controlling the evolution of bottled wine closed with stoppers, which comprises applying a pressure with a controlled and variable value over the time in the environment of the closing stopper of the bottles, which will affect the inner environment of the bottle.

More specifically, the invention proposes a method for controlling the evolution of a bottled alcoholic beverage with a closing stopper, said alcoholic beverage comprising wine and spirits, wherein a surrounding environment of a bottle or bottles containing said beverage is controlled, applying a pressure with a value equal to, greater than or less than atmospheric pressure, which causes, as a result of a variation of pressures over time (profile of pressure), an interaction of said surrounding environment with the inside of the bottle and vice versa, using a pressurization system which supplies or extracts a gas, gases or fluids of said surrounding environment.

The method of the invention is applicable to a natural cork stopper and advantageously to bottles with stoppers facilitating the application thereof, such as a stopper developed by this same inventor and referred to as CMO (Cork for micro-oxygenation), described in the Spanish patent no 200901437 filed on this same date which allows, with its grooves, being able to homogeneously and specifically control the wines or other alcoholic beverage once bottled.

Other stoppers, such as synthetic stoppers which allow the mentioned interaction between the outer environment, adjacent to the bottle, and the inside thereof, or vice versa, would also allow implementing the method.

The pressure values are generally selected to cause specific pressure changes which range around atmospheric pressures or greater or lower values, so that the wine receives its micro-oxygenation, it being possible to administer controlled and specific values for each wine, as well as to be able to control, aromatize and preserve the wine according to the criteria of each winery, sommeliers or of the end consumers.

For one embodiment of the method proposed by the first aspect of the invention, said application is performed individually on each bottle or, for another embodiment, encompassing a group of bottles.

Said application of pressure in a controlled manner furthermore comprises, for one embodiment, a control of the composition of gas, gases or fluids (e.g., particles in suspension) providing the surrounding atmosphere of the bottle or bottles, and/or of the atmospheric gas or air.

According to a first case, said control of the composition of gas, gases or fluids is carried out by means of the controlled introduction, into said atmosphere, of an oxidizing fluid, such as oxygen, and according to a second case by means of the controlled introduction, into said atmosphere, of aromatized fluids.

The method proposed by the first aspect of the invention comprises, according to the embodiment, additionally controlling the conditions of temperature of the surrounding environment of the bottles and/or additionally controlling the conditions of humidity of the surrounding environment of the bottles.

According to an embodiment of the method proposed by the invention, it comprises coupling a cap on the mouth of each bottle and using it to perform said application of pressure in a controlled manner.

According to one embodiment, the method comprises applying said individual treatment to a group of bottles, with their caps connected to common pressure control means.

The proposed method comprises, for one embodiment, performing said controlled application of pressure in the environment of an area of the bottles occupied by the closing stopper, in a cabinet or a container for preserving wine, either with common regulation means for the entire cabinet, or using a cabinet for preserving wine with several specific sectors, with differentiated pressure regulation means according to the type of wine to be stored.

Figure 5:
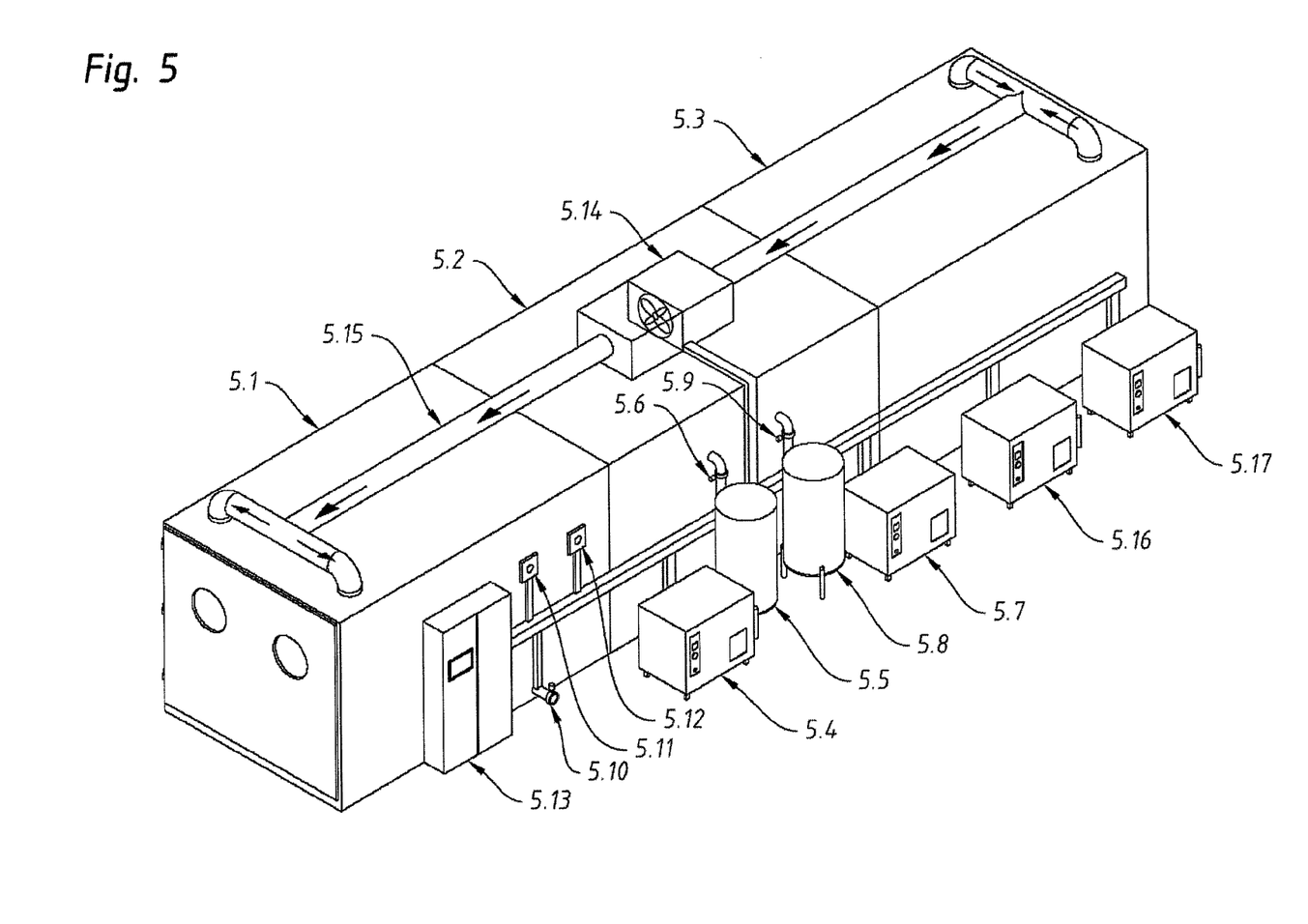
FIG. 5 illustrates an embodiment of an installation for implementing the method of the invention comprising a tight tank suitable for storing bottles of said alcoholic beverage, closed with stoppers, said tight tank being formed by several assembled modules (which facilitates assembly and transport) and having associated therewith pressurization, heating, cooling and ventilation means.

For another alternative embodiment, said controlled application of pressure in the environment of an area of the bottles occupied by the closing stopper is performed in a closed enclosure of a wine cellar, or in a container to that effect (FIG. 5)

A second aspect of the invention relates to an installation for controlling the evolution of the bottled wine closed with stoppers, comprising a system for controlling the pressure in the environment of the bottles.

For one embodiment of the proposed installation, it furthermore comprises means for controlling the composition of the atmosphere surrounding the bottles.

The installation proposed by the second aspect of the invention comprises, for another embodiment, means for intercommunicating, with a controlled pressure enclosure, an end area of the neck of each bottle, comprising a cap or envelopment coupled to each of the necks of the bottles, which cap has one or more through holes for an implementation of said embodiment.

For the embodiment for which the mentioned controlled application of pressure is carried out by administering a fluid to the bottles closed with stoppers, such fluid can be the same surrounding fluid in the environment in which said bottles are located or it can be a fluid with specific characteristics, such as pure oxygen, or combinations of gases, including atmospheric gas, or a fluid which has previously been treated with aromatic substances, in order to transmit specific aromas and flavours to the wine. According to the embodiment, the administration of said fluid is carried out in a general manner, i.e., applying pressure changes in the air of closed receptacles such as wine-preserving cabinets or in specific rooms intended for this purpose such as a container to that effect, or being administered individually, or in specific sets.

If the gases can be offensive or hazardous for the particular personnel in charge of the installation, for one embodiment the method proposed by the first aspect of the invention comprises using an individual elastic retractable cap for each bottle, where there is at least one hole for supplying the fluid to be administered or alternative vacuum, by the same or another duct, by means of valves allowing it.

For another embodiment, for the purpose of having a subsequent greater cleaning, the method comprises using a cap with two holes, one for pressurization and another one for applying the vacuum which, upon being jointly activated, will cause a sweep.

Said caps are very useful for saving specific gases, or for separately administering criteria of pressure and vacuum to bottles with different wine.

In parallel, the advantage which can be provided by the use of said cap is that a set of bottles with determined pressure and vacuum characteristics can be treated, and alternatively variations can be applied to other sets of bottles located in the same enclosure, connected to another section of caps with different application characteristics.

Continuing with the embodiment described above in which the proposed method comprises using a wine-preserving cabinet, in one case the latter has an environment controlled by a temperature and humidity established in at least one section where there is located a series of bottles of a young wine requiring a quicker evolution than those located in other sections of the cabinet, which contain bottles with an already aged wine with a long evolution time requiring a minimum administration of micro-oxygenation so that it is not oxidized.

It would be necessary to apply greater, more aggressive and frequent pressure changes in the first case, where the bottles of young wine are located, so that the oxygen molecules oxidize the wine and the latter evolves quickly, in comparison with the bottles of aged wine. Alternatively, the bottles of the young wine could also be positioned vertically, whereby when the oxygen enters, it has a larger contact surface than the one it has in horizontally arranged bottles, wherein the contact is only at the end of the grooves of the stoppers. Another position variant of the bottle could be inclined, where the wine contacts half the surface of the stopper, leaving an inclined chamber.

The method also comprises, for one embodiment, applying a constant vacuum linked to the bottles of evolved wine, thus delaying the fulfilment thereof.

For another embodiment of the method proposed by the first aspect of the invention, the latter comprises in addition or as an alternative to the described embodiments, applying pressure in one duct of the caps and vacuum in the other one, to cause a stream which extracts towards the outside the stale fluid from the bottles, such that a process of ventilation or of recirculation of clean air to the caps is thus performed.

With reference to the aforementioned embodiment of the method proposed by the invention, where it is applied in a wine cellar, the latter must advantageously have a receptacle or container intended for this task, which, for a better application, would have to have leak-tight closures in its accesses, since the applications of pressure and vacuum, although only in their atmospheric variants, require a tight medium for their perfect application.

For one embodiment for which said room has a contaminated inner atmosphere, for example, with an excessive humidity, or the decision was made to apply a cleaner fluid or a fluid with special peculiarities due to the criterion of the technicians, the proposed method comprises having a pressurized tank with said fluid for the administration of the pressures.

It should be highlighted that the application of the vacuum is important but not essential for the quicker renewal of the gas introduced in the grooves of the stoppers. Emphasis is thus made on the fact that if a fluid, with an important economic value per se, is added, it would not be interesting to apply a vacuum to extract the volume of the entire room, since the latter would not be rightly used. Alternatively, there is the option of the caps, where the consumption would be more adjusted and where the vacuum could interact to more easily renew the gas of the grooves of the stoppers. All this would not be necessary if atmospheric air were used, since this would only entail the electric consumption of the systems for administering pressurization and vacuum.

As an alternative or in addition to the embodiments described above, the proposed method comprises providing the bottled wine which so requires with specific flavours and aromas, depending on each consideration or preparation, leaving the wine more open, and in relation to the taste phase, rounding off the tannins and the integration thereof, noting the wood more. An example would be the transmission of subtle flavours to the wine, such as a nutty flavour, such as a walnut flavour, or even spices such as a vanilla flavour or a previously wetted oak wood flavour. This is achieved by having at least one of these elements in a receptacle prepared for such task, either in the room, in the ducts of the caps or even in the caps themselves. It must be taken into account that the variety of flavours to be applied can be very large at the level of the end consumer or under the supervision of a sommelier.

For a suitable transmission of said aromatic substances, the application of heat and wetting favouring their transport has been provided. Another variant of the method comprises applying it by alternating the vertical, horizontal or inclined position of the bottles to be aromatized.

For another embodiment of the proposed method, it comprises applying the vacuum in the closed and horizontally arranged bottle, in the phase of end of the forced micro-oxygenation in the bottle, i.e., after the wine has been micro-oxygenated enough to reinforce its evolution. With the application of a negative pressure, it is achieved that the wine gradually extends partially towards the grooves of the stoppers and, consequently, partly fills them, thus leaving the end product finished, with a minimum interaction for its evolution with the usual atmospheric changes.

In the treatment of bottles of wine with a closing stopper according to this invention designed to provide, as a result of a variation of pressures over time, a controlled interaction between an outer environment, immediate environment or an environment very close to the bottle, and the inside thereof, which allows a circulation of gases in one direction or the other (entrance or exit from the bottle), it has been verified that said treatment can be differentiated depending on the position of the bottle. An example would be the application of any profile of pressures that are equal to, greater than or less than the atmospheric pressures around the neck of the bottle, the latter being in a vertical position, wherein said treatment, in some cases, causes a reaction due to the contact of oxygen with the wine, resulting in an increase of a gas in said chamber, said gas reducing the entrance of $O_2$. This involves the advantage that at the same time as a micro-oxygenation occurs, there is an evolution of the wine or alcoholic beverage, without the colour thereof changing excessively.

In another treatment, under identical conditions as regards the pressures and gases administered, highly considerable differences have been observed according to the position of the bottle resting on a side or horizontally. In the latter position, when the wine receives the direct contact with the oxygen, and since there is no gas chamber, it undergoes a more aggressive treatment and changes in colour, similarly to what occurs in a natural state.

Other positions of the bottle involve significant variations in the application of the aging or evolution of the wine.

Therefore the method of the invention envisages arranging the bottles in a determined selectable orientation and maintaining said orientation for a predetermined time period under controlled conditions of pressurization.

The latter treatments set forth age the wine in a highly significant manner, depending on the exposure or repetitiveness of the method. In other words, if absolute pressures or negative pressures are applied in more spaced out or shorter times, the aging process will be slower or more accelerated. This aging increases in a highly significant manner if the gas used is oxidative.

All this is due to the ventilation or renewal of the gases in the ducts of the closing stopper used.

It is also characteristic of this invention that after a controlled evolution of the alcoholic beverage, by the application of at least one controlled pressurization, a sealing of the bottles is performed which prevents the mentioned interaction between the surrounding environment with the inside of the bottle and vice versa, i.e., the wine or spirit is fixed in the degree of evolution provided by the method.

In a preferred embodiment, said sealing comprises the application of a gas-impervious capsule covering the closing stopper of the bottles.

The invention also relates to an installation for controlling the evolution of a bottled alcoholic beverage with a closing stopper, said alcoholic beverage comprising wine and spirits, which installation includes a tight enclosure suitable for storing bottles of said alcoholic beverage, closed with stoppers allowing an interaction of said tight enclosure with the inside of the bottle and vice versa of the bottle and a system for controlling the pressure which follows a determined profile over time and the composition of the atmosphere in the environment of the bottles in said tight enclosure.

The mentioned tight enclosure is formed by a tight tank where the bottles are located, and having associated therewith positive and negative pressurization means, cooling means, and controlled inner air recirculation and heating means.

In a preferred embodiment, the mentioned tight tank comprises several assembled modules.

It has furthermore been provided that at least one of said modules houses therein a mechanical device for orienting the position of the bottles arranged in a mobile bearing structure for a treatment, in a selected orientation, for a determined time period.

BRIEF DESCRIPTION OF THE DRAWINGS

The previous and other advantages and features will be more fully understood from the following detailed description of several embodiments with reference to the attached drawings, which must be considered in an illustrative and non-limiting manner, in which:

FIG. 1.1 shows a partial section view of part of a bottle closed by a CMO stopper and with a cap provided to be used to apply the method proposed by the first aspect of the invention, for one embodiment;

FIG. 1.2 shows two views of the cap of FIG. 1.1, the left view corresponding to a section taken through the section line B-B' indicated in the right view, and the right view to a section taken through section line A-A' indicated in the left view;

FIG. 4.1 illustrates a schematic perspective view of part of the installation proposed by the second aspect of the invention, to be integrated with the elements shown in FIG. 2, for another embodiment, applied to a set of six bottles in an inclined position, referred to as Group C;

FIG. 4.2 is a longitudinal section of part of one of the bottles illustrated in FIG. 4.1, with the neck thereof coupled to a cap such as that of FIGS. 1.1 and 1.2;

DETAILED DESCRIPTION OF SEVERAL EMBODIMENTS

The following description of the embodiments illustrated by FIGS. 1.1 to 4.2 must be considered valid both in relation to the installation proposed by the second aspect of the invention and for the different elements used to apply the method proposed by the first aspect of the invention for several embodiments.

Figure 11:
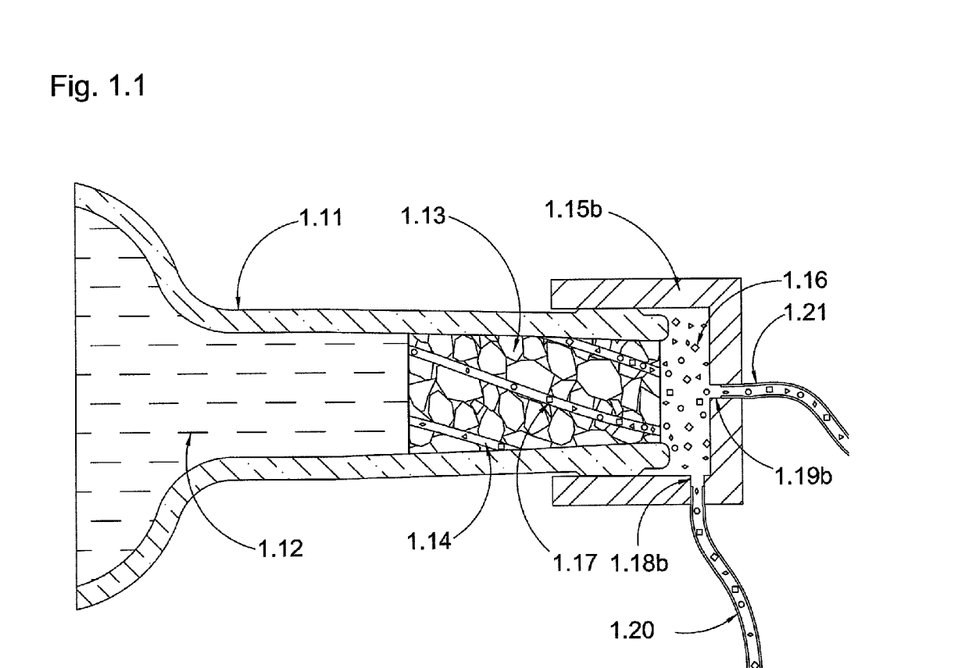
Figure 12:
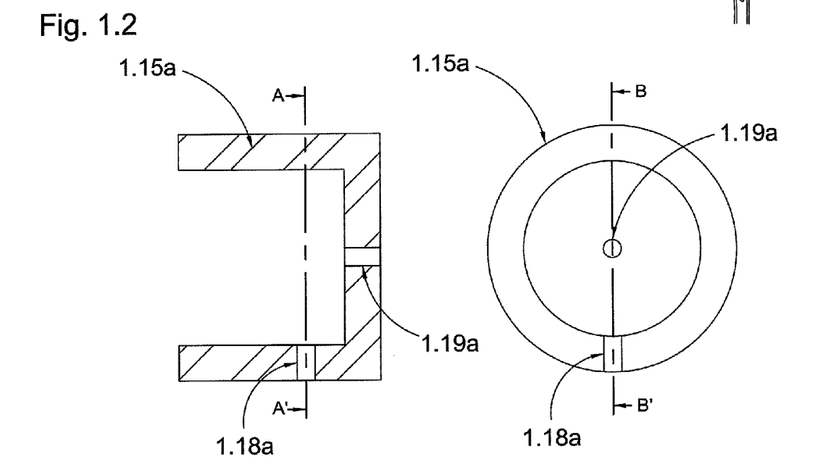

With reference first to FIGS. 1.1 and 1.2, they depict a bottle 1.11 containing a liquid 1.12 and which is closed with a CMO stopper 1.13 having recesses 1.14 through which a fluid 1.16 and 1.17 can circulate, and where a cap 1.15b closes the mouth of the bottle 1.11. Said cap 1.15b has a hole 1.19b connected to a tube 1.21 for applying a fluid 1.16 under pressure, introducing it through the hole 1.19b. In the lower area of the cap 1.15b there is located another hole 1.18b through which it is communicated with a tube 1.20, which is a duct which is used to apply the vacuum inside the cap 1.15b.

FIG. 1.2 depicts the section plane of the cap 1.15a which shows the hole 1.19a through which a fluid 1.16 under pressure is transmitted, and the hole 1.18a through which the vacuum is applied.

It must first be indicated that the following description only intends to illustrate several embodiments of the method and installation proposed by the present invention, for which a cabinet for preserving wine is used, where the conditions of temperature and those of relative humidity are controlled by sections.

Figure 2:
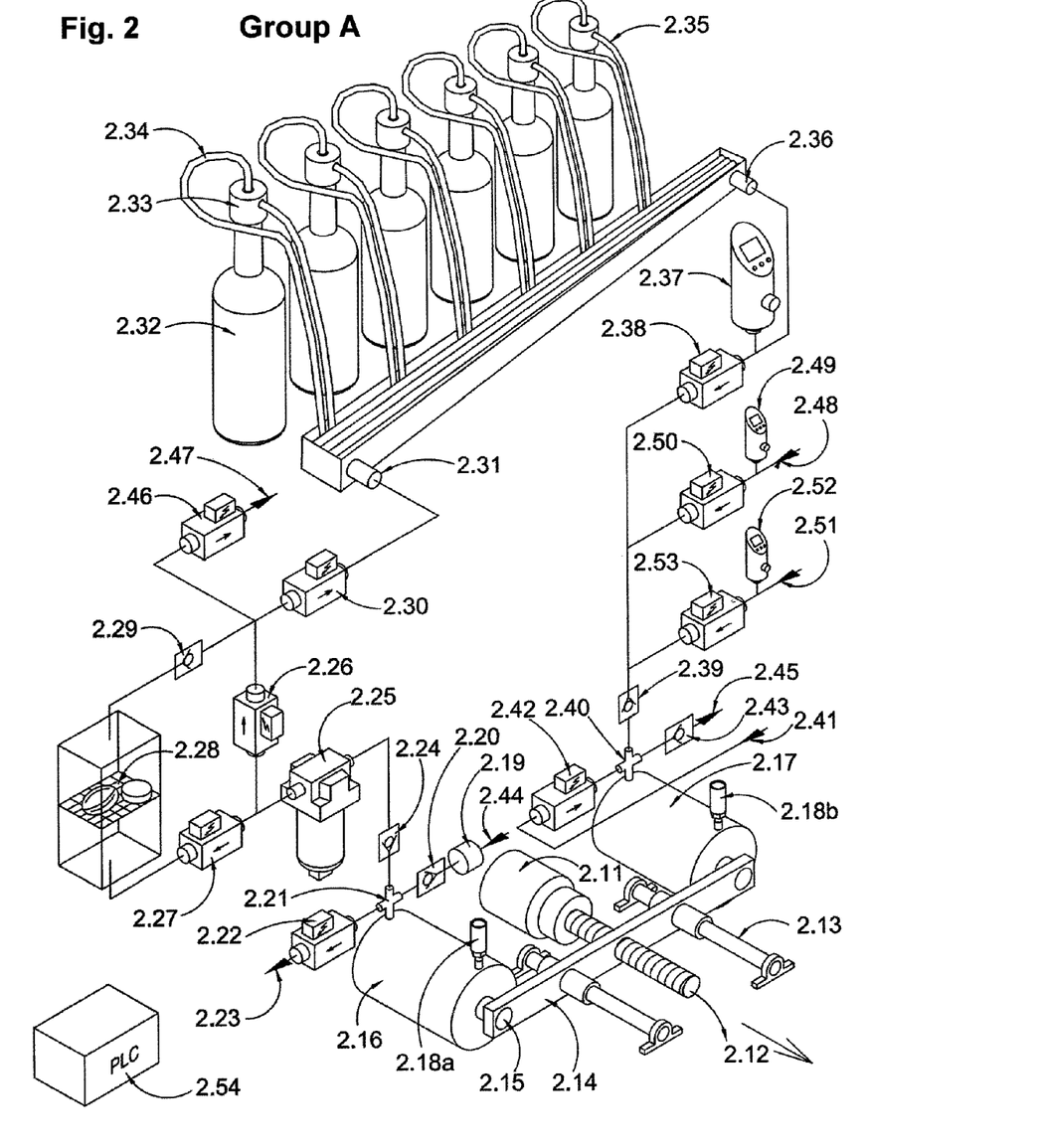
FIG. 2 illustrates a perspective view of the installation proposed by the second aspect of the invention for an embodiment applied to a set of six bottles of bottled wine in a vertical position referred to as Group A.
Figure 3:
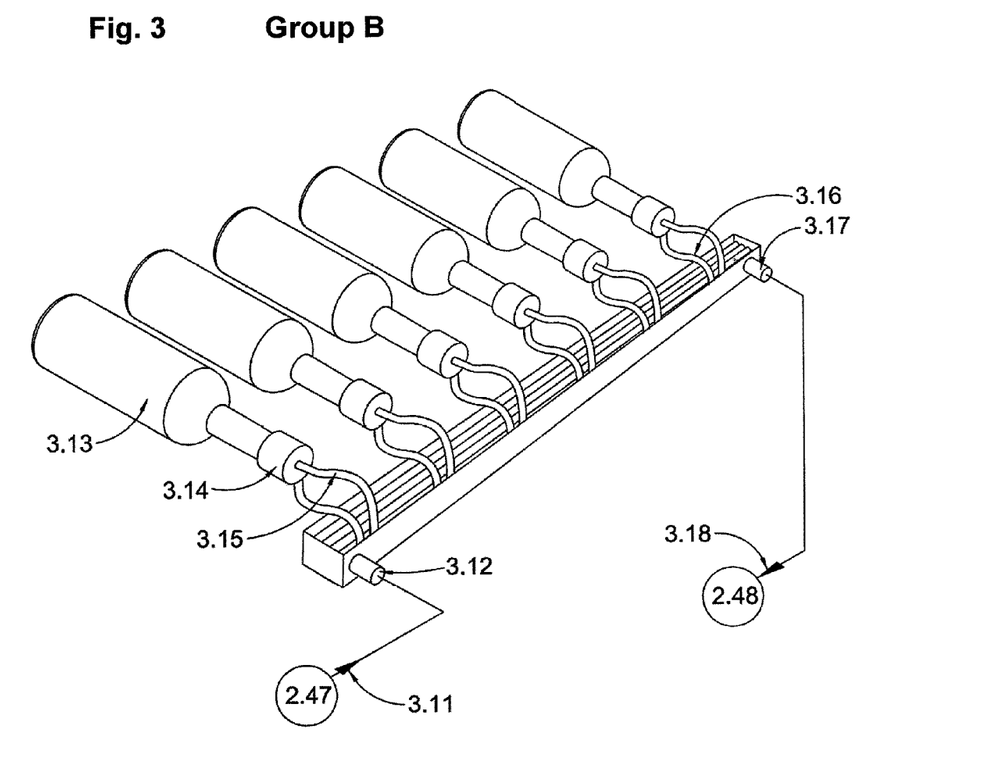
FIG. 3 shows a perspective view of another set of six bottles, in this case in a horizontal position, referred to as Group B, to be integrated in the installation proposed by the second aspect of the invention of FIG. 2, for one embodiment.
Figures 41, 42:
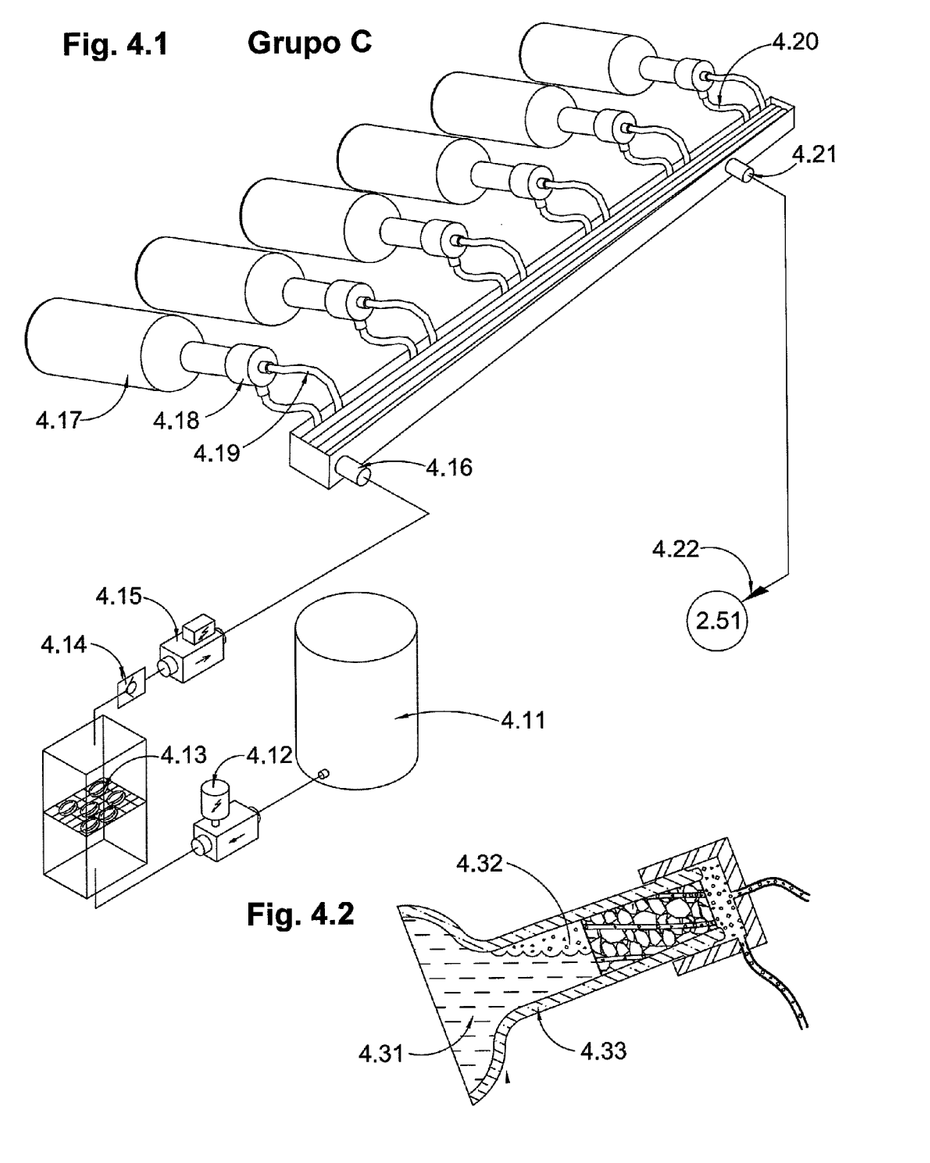

Said cabinet has three shelves, in one of which there is arranged the set of six vertical bottles 2.32, indicated as Group A in FIG. 2, the set of six horizontal bottles 3.13, indicated as Group B in FIG. 3 and the set of six inclined bottles 4.17, indicated as Group C in FIG. 4.

FIG. 2 particularly illustrates Group A, formed by bottles 2.32 requiring a micro-oxygenation with more constant and higher pressures than those of the remaining sections of the cabinet, due to the fact that the wine that they contain requires it. Furthermore, in this case, a very subtle nutty and wetted French oak aroma was to be added. These elements have been arranged in the location depicted in said FIG. 2 as 2.28. A cap 2.33 with two outlets connected to two tubes, one tube 2.34 for administering a pressure and another tube 2.35 for applying a vacuum has been incorporated to each of these six bottles 2.32. This set of caps 2.33 is connected by means of said tubes 2.34 and 2.35 to a distributor from where there emerges a general tube connected to the positive pressure system 2.31 and another one connected to the negative pressure system 2.36.

The mentioned six bottles 3.13 in a horizontal position which form Group B, illustrated in FIG. 3, with conditions of temperature control different from those of the first bottles 2.32 and without humidity control, are located in another shelf of said cabinet. The bottles 3.13 of this Group B require a slower micro-oxygenation due to the fact that the wine is already aged. This is achieved with specific programs located and commanded by the control system 2.54 illustrated in FIG. 2, by means of which, once it is considered that the wine has reached its ideal state, overpressure values are maintained or rather the negative pressures prevail in order to be able to maintain the wine in a lethargic but resistant state in its evolution.

With reference to Group C of bottles 4.17 of FIG. 4.1, the particularization of specific conditions of temperature, humidity, aromas and atmospheric pressure which correspond, as much as possible, to those of a specific area or location, has been envisaged. This Group C of bottles 4.17 in an inclined position also differs very substantially from the previous one because it does not use air from the surrounding atmosphere, using instead a specific gas, extracted from the area which is to be represented, compressed and packaged in a tank 4.11. Its transfer and application to the caps 4.18 of the bottles 4.17 is carried out by means of a servo-piloted regulating valve 4.12. And the pressure or negative pressure values are supplied with respect to the atmospheric history of said site, previously programmed in the PLC device 2.54 (FIG. 2), which will give the suitable orders to the valves for their opening and closing. In this case, aromas of wild berries 4.13 specific for said area will be applied, applying these pressure changes and aromas until achieving the objective of this group, which is to make the wine evolve correctly and representing conditions that are peculiar and specific for a concrete area.

In the embodiment illustrated by FIGS. 2 to 4.1, it must be indicated that each group of bottles has defined therein a computer program applied by means of the mentioned PLC 2.54 and controlling the pressures of each module by means of pressure sensor devices 2.37, 2.49 and 2.52.

FIG. 2 illustrates a perspective view of the installation proposed by the second aspect of the invention, particularly showing the different elements forming the system for controlling the pressure comprised therein, for one embodiment, for which it is applied to a set of six vertically arranged bottles 2.32, or Group A, there being arranged in the part of the neck of the bottles 2.32 a series of caps 2.33 at the end of which they are connected to tubes 2.34 which are communicated with a manifold 2.31 through which the pressurized fluid passes, and to tubes 2.35 which are communicated with a manifold 2.36 through which the vacuum is applied, in a manner similar to how the tubes 1.21 and 1.20 of the cap 1.15b do so.

Continuing with the description of said FIG. 2, it illustrates a motor 2.11 connected to a spindle 2.12, by means of which the pressures are transmitted, the run of the spindle 2.12 being stabilized by means of the guides 2.13 which, by means of the guardrail 2.14, attach the ends 2.15 of two pistons 2.16 and 2.17 so that they perform back and forth movements producing the pressures 2.44 or vacuum 2.45, as a result of the fact that the fluid is not compressed in the opposite part, since they have two filters 2.18a 2.18b with free exits to the outside.

The fluid is acquired by the pistons 2.16 and 2.17 from outside of where the system 2.44 is located, the fluid passing through an activated carbon filter 2.19, after which it penetrates the distributor 2.21 where the piston 2.16 aspirates the air acquired until reaching the end of its run. Subsequently, when the run is towards the distributor 2.21, the valve 2.22 remains closed and the piston 2.16 generates pressure of the fluid which is directed towards the check valve 2.24, since the check valve 2.20 prevents its leakage.

The piston 2.17 is in charge of generating the vacuum as follows: the valve 2.42 is maintained closed, such that the fluid coming from the area of the bottles 2.32 is introduced in the piston 2.17, which expels it towards the outside 2.45.

In the direction of the pressure the fluid enters a filter 2.25 like a liquid drainage, which can subsequently be split into two directions: one towards the valve 2.27 passing through the location where the aromatic elements 2.28 are located, closing the valve 2.26, or towards the latter, closing the valve 2.27.

If the decision is made to open the valve 2.26 and the valve 2.30, the fluid will go towards the manifold 2.31, distributing the pressure controlled by the sensor device 2.37 to the caps 2.33. If the decision is made to close the valves 2.30 and 2.27 and open the valve 2.46, the fluid would be directed towards 2.47, i.e., towards the area where the bottles 3.13 of Group B of FIG. 3 (which will be described below) are located, without passing through the aromatic elements 2.28, since the check valve 2.29 would prevent it from retreating towards such elements 2.28.

To work with the bottles 2.32 of Group A of FIG. 2, the valves 2.46 and 2.26 must be closed, and the valve 2.27 and the valve 2.30 must be opened, such that the aromatized fluid passes towards the manifold 2.31, transmitting it to the sector of the caps 2.33. This is possible because the valve 2.38 preventing the fluid from moving towards the vacuum sector is closed.

The pressure sensor device 2.37 transmits, wirelessly or by means of wiring (not illustrated), the pressure values in the form of data which are processed by the PLC 2.54 illustrated in the bottom left corner of FIG. 2. With it, the intention is to demonstrate that by means of the present invention the desired continuous cycles can be performed with the piston 2.16, whereby countless bottles 2.32 with their caps 2.33 could be fed, until reaching the predetermined pressure.

Subsequently, the valve 2.30 and the valve 2.42 are closed and the valve 2.22 is opened, the function of which is that the piston 2.16 works under open exhaust 2.23. The valve 2.38 is also opened so that the fluid moves in the direction of the vacuum, outwardly discharging 2.45 all the pressure. Once the pressure is expelled, the valves 2.27 and 2.26 located in the sector of the piston 2.16 exerting the pressure are closed, leaving said piston 2.16 moving but without generating any pressure, since the fluid enters through the check valve 2.20 and is expelled towards the outside 2.23 by means of the opening of the valve 2.22.

Subsequently, a vacuum towards the sector of the bottles 2.32 is applied, for which the valve 2.42 and the valve 2.30 are closed and the valve 2.38 is opened, whereby the fluid is extracted towards the outside 2.45, causing a continuous negative pressure in the sector of the bottles 2.32.

If the vacuum is to be applied to other locations, the valve 2.50 would have to opened and the valve 2.38 would have to be closed, in order to extract the fluid of Group B (see FIG. 3), or the valves 2.38 and 2.50 would have to be closed and the valve 2.53 would have to opened in order to apply the vacuum to the bottles 4.17 of Group C, whereby controlled pressures could be applied at intervals to different sectors where the bottles of the different Groups A, B and C are located.

It should be indicated that the installation proposed by the second aspect of the invention, as illustrated in FIG. 2, is made up of a single motor 2.11 with two pistons 2.16 and 2.17 which, in the back and forth cycles, can encompass pressure changes in a large amount of bottles, as a result of the fact that when one generates pressure in one direction the other one is performing an open exhaust.

Continuing with the description of FIG. 2, which is where the main elements of the installation proposed by the second aspect of the invention, particularly those of the pressurization systems, are illustrated, it must be indicated that the pistons, which in this case have been used by way of example, are of the standard industrial type, i.e., they have a plunger, with its gaskets in the inner chamber thereof, the shaft acting as an actuator being anchored in one of the bases of each plunger, and filters 2.18a and 2.18b are located in each of the chambers which are not used to compress so that said chambers always work under open exhaust.

As has been indicated above, to perform the pressure acquisition process, the motor 2.11 is operated, the shaft of which motor is assembled to a spindle 2.12. This assembly is guided in its run by two rules 2.13. In part 2.14 of the spindle there is a guardrail attaching the ends 2.15 of the actuators of the two pistons 2.16 and 2.17, so that once the motor 2.11 has been operated there is a linear stroke of both of them and they move the pistons 2.16 and 2.17 towards their ends. In other words, when the piston 2.16 moves towards the distributor 2.21 the fluid is being compressed, since the check valve prevents it from escaping towards the intake inlet, and when the piston 2.16 moves towards the intake filter 2.18a of the other open exhaust chamber, the fluid 2.44 passing through the carbon filter 2.19 is acquired and subsequently the fluid is compressed and moves towards the distributor 2.21, i.e., a back and forth run is performed.

Since the piston 2.17, which in this example of application generates the vacuum, is also assembled to the guardrail 2.14, the latter also moves. When all this occurs, and only generating a pressure is required, the vacuum system must be under open exhaust, because since it is fixed to the element 2.14 its plunger also moves. For this to be effective, the valve 2.42 is opened, whereby the air 2.41 aspirated by the compression chamber of said piston 2.17 passes through said valve 2.42 towards the distributor 2.40, and in its run the check valve 2.39 prevents it from moving towards the valve 2.38 and it is directed to the check valve 2.43, flowing towards the outside through the valve 2.45. Furthermore, the valve 2.38 remains closed to prevent the pressure coming from the other sector of the bottles from being able to escape towards the vacuum, performing continuous cycles and recirculating the air without compressing it, i.e., the piston 2.17 works under open exhaust.

If the method in the pressure system is reversed, reverse results are also obtained, i.e., a vacuum pressure will be obtained in one section and an open exhaust in the other one. It is thus evident that with a single motor 2.11 and a system of guides, pressure results in a piston 2.16 or vacuum results in the other piston 2.17 are randomly obtained, combining open exhausts in the piston the performance of which is not required.

In the event that cleaning the pipes is required, it is possible to apply a sweep to clear the ducts 2.34 and 2.35 of doors. To that end, the valves 2.22 and 2.42 are closed and the rest are left open, except for the sector 2.28 (aromatization), whereby pressure and vacuum are being applied at the same time, obtaining an inner stream in the tubes 2.34 and 2.35 which will allow cleaning them. This operation can be applied at predetermined times.

Returning to the description of the treatment of Group A of FIG. 2, first a pressure is applied in the piston 2.16 and the valve 2.22 is operated in order to close it, whereby the fluid is directed towards the valve 2.24 and passes through the water condensing filter 2.25. Then, the valve 2.26 is closed and the valve 2.27 is opened, which causes the fluid to move the aromatic elements located in 2.28. passing towards the check valve 2.29, the valve 2.46 being closed, whereby the fluid tends to move towards the open valve 2.30, entering the pressure manifold 2.31 and moving towards the tubes 2.34 ending in the caps 2.33 of the bottles 2.32. Said pressure can be increased or stabilized for the required time, as a result of the fact that the valve 2.38 is closed and that the vacuum system of the other piston 2.17 is working under open exhaust mode.

Once the time programmed for the administered pressure has elapsed, it is extracted, closing the valve 2.30 and opening the valve 2.38, and the pressure existing in the negative pressure circuit is discharged.

Subsequently, the vacuum is applied in said circuit. To that end, it is necessary to have the valves 2.42, 2.30 closed and the valve 2.22 open, the vacuum being produced in a controlled manner by means of using the sensor device 2.37.

After this operation, and as an end of the evolution of the bottled wine in the bottles 2.32, the bottles 2.32 are arranged in a horizontal position, and a vacuum is applied with values less than the atmospheric value. It is thus achieved that the wine, which at this time is in contact with the stopper, flows in a minimal manner towards the channels thereof, filling them. Once the latter operation has been performed, the specific micro-oxygenation of the bottles referenced herein as Group A is considered ended.

It must be indicated that valves are illustrated in this FIG. 2, particularly the valves 2.46, 2.50 and 2.53 which, for the treatment to the bottles 2.32 of Group A, remain closed. Said valves 2.46, 2.50, 2.53 divert the fluids for the embodiments of FIGS. 3 and 4.1 which will be described in more detail below.

In relation to the treatment of the bottles 3.13 of Group B of FIG. 3, it can be seen how they are connected to their respective caps 3.14, at the end of which there are coupled the pressurization tubes 3.15 and vacuum tubes 3.16, connected to their respective manifolds 3.12 and 3.17, through which the pressurized fluids 3.11 and the vacuum fluids 3.18 circulate. The pressurized fluid comes from the ducts of FIG. 2, particularly from the circuit passing through the valve 2.46, which makes the fluid 2.47 circulate towards Group B, at times in which vacuum is being applied in Group A or a specific pressure, closing the valve 2.30, is being retained.

Combinations with pressurization periods intercalated with the other groups can be made.

The vacuum is transmitted to Group B by means of the valve 2.50, where the aspirated fluid 2.48 comes from the area 3.18 aspirating the vacuum of the manifold 3.17. These pressure processes of Group B are controlled by means of the pressure sensor device 2.49 in combination with the program predetermined for this application in the PLC 2.54. (FIG. 2)

The treatment of the bottles 4.17 of Group C of FIG. 4.1 is described below, which bottles, as has been indicated above, are arranged in an inclined position, as illustrated in detail in FIG. 4.2 for one of said bottles 4.17. A special fluid located in a pressurized vat 4.11A is applied to the bottles 4.17 of this group. In order to be able to apply this pressure, a servo-piloted regulating valve 4.12 has been provided. Specific aromatic elements 4.13 which can be differentiated from those applied in the other groups have been prepared.

First, the valve 2.53 is closed and the valve 4.12 is opened progressively, and the fluid passes until finding the aromatic elements 4.13. Subsequently, they pass, together with the fluid, through the check valve 4.14 and move through the open valve 4.15, until reaching the manifold 4.16, where the tubes 4.19 distribute them towards the caps 4.18, the entire circuit being impregnated with the administered fluid, including the tubes 4.20, and being retained, since the valve 2.53 remains closed, controlling the pressure thereof by means of the pressure sensor device 2.52 in combination with the PLC 2.54 (FIG. 2). Once the stipulated time has elapsed, the valve 4.15 is closed and the valve 2.53 is opened, whereby the fluid will be driven by the manifold 4.21 and discharged from the circuit, towards 4.22. Subsequently, a vacuum cycle will be applied thereto in combination with the one applied to Groups A and B.

In relation to FIGS. 5 to 10, which are self-explanatory, based on the previous description, the following reference numbers which are indicated in each case have been used.

FIG. 5
5.1 First module with access door for receiving and extracting the stoppered bottles to be treated.
5.2 Auxiliary tight tank module for extending the storage volume.
5.3 Rear or last tight tank module.
5.4 Pressurization system, with treatment values greater than atmospheric pressure.
5.5 Vessel for storing the pressurized gas for the subsequent application.
5.6 Servo-piloted regulating valve for regulating the pressure to be administered.
5.7 Vacuum system, with treatment values less than atmospheric pressure.
5.8 Vessel with vacuum values for a subsequent extraction of the gases from the tank.
5.9 Servo-piloted regulating valve for regulating the negative pressure to be administered.
5.10 Depressurization valve.
5.11 Pressure sensor device for communicating the values to the automatic system of the process.
5.12 Temperature probe for communicating the values to the automatic system of the process.
5.13 Programmable automatic system for controlling the process.
5.14 Ventilation system for homogenizing the gases and the temperature inside the tank.
5.15 Ducts for distributing the inner air.
5.16 Heating system.
5.17 Cooling system.

Figure 6:
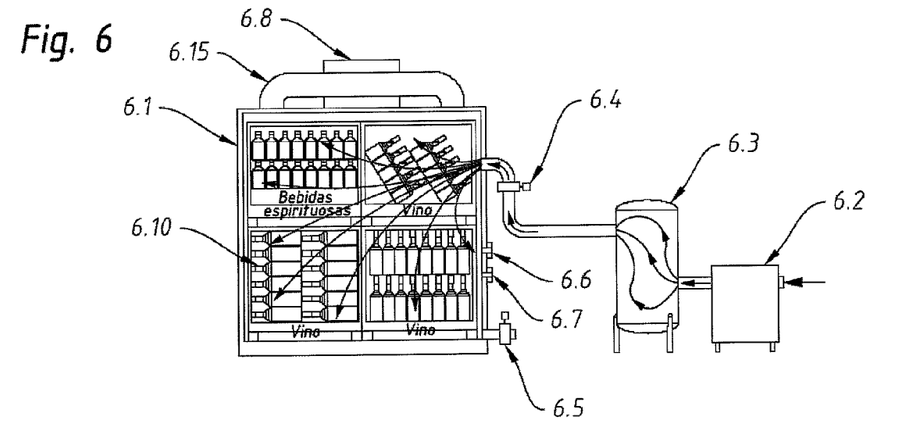
FIG. 6 and FIG. 7 illustrate modules of the mentioned installation provided for applying a positive or negative pressure to enclosures in which the beverages are stored.

FIG. 6
6.1 First module with access door for receiving and extracting the stoppered bottles to be treated and several differentiated storage compartments.
6.2 Pressurization system, with treatment values greater than atmospheric pressure.
6.3 Vessel for storing the pressurized gas for a subsequent application.
6.4 Servo-piloted regulating valve for regulating the pressure to be administered.
6.5 Depressurization valve.
6.6 Pressure sensor device for communicating the values to the automatic system of the process.
6.7 Temperature probe for communicating the values to the automatic system of the process.
6.8 Ventilation system for homogenizing the gases and the temperature inside the tank.
6.9 Ducts for distributing the inner air.
6.10 Container for the location of the bottles to be processed.

Figure 7:
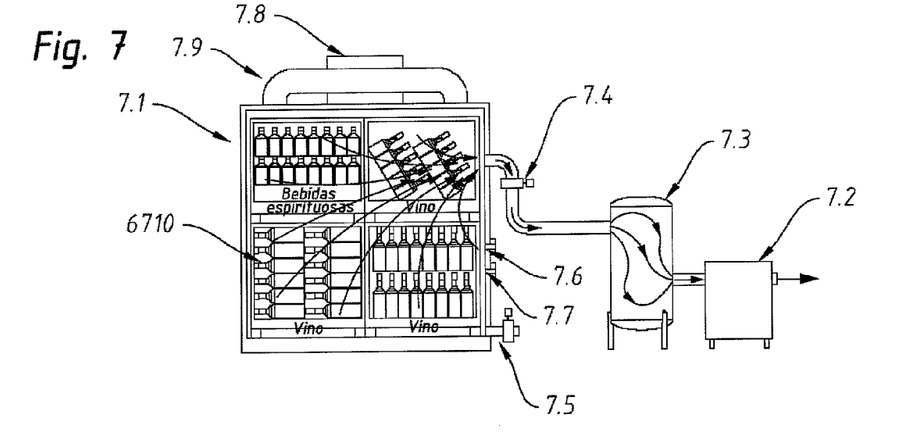

FIG. 7
7.1 First module with access door for receiving and extracting the stoppered bottles to be treated.
7.2 Vacuum system, with treatment values less than atmospheric pressure.
7.3 Vessel with vacuum values for a subsequent extraction of the gases from the tank.
7.4 Servo-piloted regulating valve for regulating the negative pressure to be administered.
7.5 Depressurization valve.
7.6 Pressure sensor device for communicating the values to the automatic system of the process.
7.7 Temperature probe for communicating the values to the automatic system of the process.
7.8 Ventilation system for homogenizing the gases and the temperature inside the tank.
7.9 Ducts for distributing the inner air.

Figure 8:
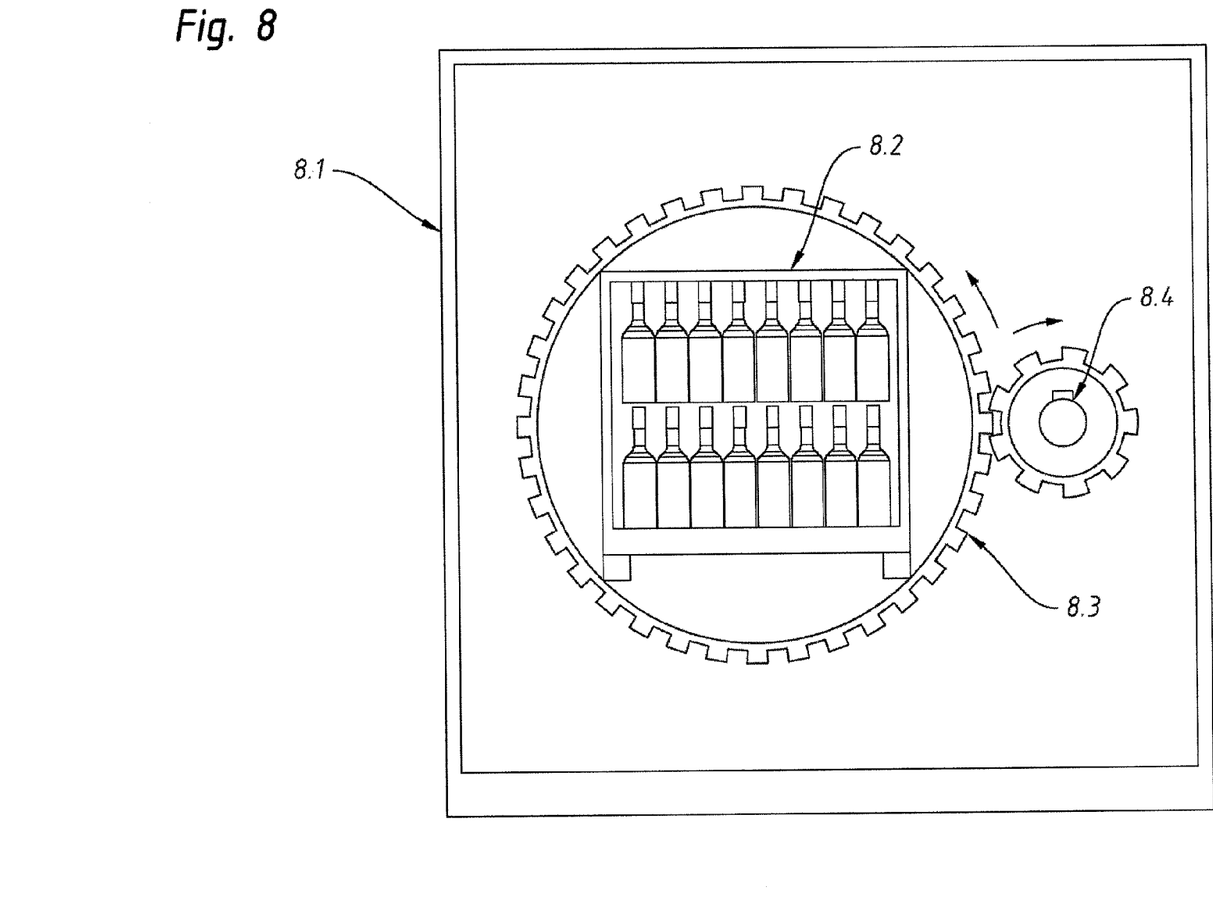
FIG. 8 illustrates an embodiment with a rotating container allowing a particular orientation of the bottled beverages, for a treatment for a determined time period.

FIG. 8
8.1 Tight tank
8.2 Special rotating container for the location of the bottles to be processed and the arrangement of the bottles in a desired inclination, during a treatment period.
8.3 System for rotating the container of bottles.
8.4 Drive motor system for rotating the container.

Figure 9:
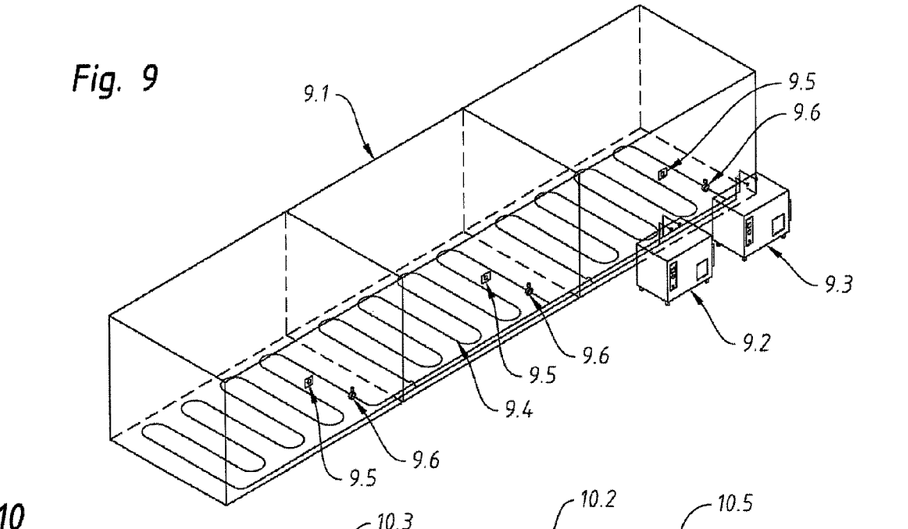
FIG. 9 illustrates heating means associated with the mentioned tight tank.

FIG. 9
9.1 Tight tank
9.2 Heating system.
9.3 Cooling system.

Figure 10:
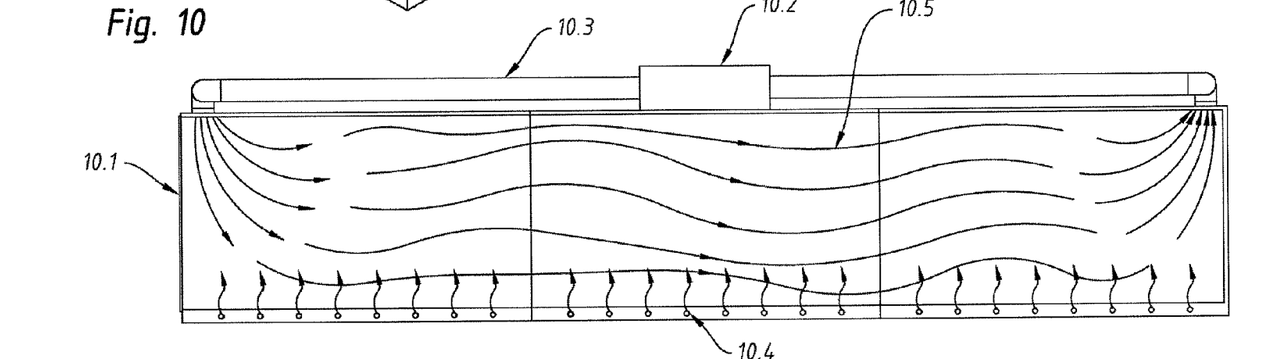
FIG. 10 shows a ventilation system for homogenizing the gases and the temperature inside the tank.

9.4 Circuit for heating or cooling the inside of the receptacle.
9.5 Temperature probes.
9.6 Distributor valves for homogenizing the temperature of the circuit.
FIG. 10
10.1 Tight tank
10.2 Ventilation system for homogenizing the gases and the temperature inside the tank.
10.3 Ducts for distributing the inner air.
10.4 Circuit for heating or cooling the inside of the receptacle.
10.5 Air flow for stabilizing and/or homogenizing the temperature of the receptacle.

A person skilled in the art could introduce changes and modifications in the embodiments described without departing from the scope of the invention as it is defined in the attached claims.

The invention claimed is:

1. A method for controlling evolution of an alcoholic beverage, said alcoholic beverage including at least one of wine and spirits and being placed in a container and closed at all times with a stopper, the method comprising:
providing a controlled gaseous environment in at least one area of a surrounding closed environment of a container, with a pressure following a specific profile of values over time, with a value equal to, greater than or less than atmospheric pressure,
causing a controlled interaction between the surrounding closed environment and the inside of the container while the container is closed at all times with the stopper, and
providing and extracting a gas, gases or fluids to and from said surrounding closed environment using a pressurization system while the container is closed with the stopper.

2. The method according to claim 1, wherein changes of predetermined values in the applied pressure occur.

3. The method according to claim 1, further comprising controlling the composition of the gas, gases or fluids supplied to the said surrounding closed environment of the container.

4. The method according to claim 3, wherein at least one of the gases and fluids to be applied is oxidizing.

5. The method according to claim 3, wherein said gas is an atmospheric gas.

6. The method according to claim 1, wherein the gas, gases or fluids to be applied are aromatized.

7. The method according to claim 1, further comprising controlling the conditions of a temperature of the said surrounding closed environment of the container.

8. The method according to claim 1 or 7, further comprising controlling the conditions of humidity of the said surrounding closed environment of the container.

9. The method according to claim 1, wherein method is performed inside a tight tank, delimiting said surrounding closed environment of the container, inside which the stoppered container to be processed is located in a predetermined position.

10. The method according to claim 1, wherein further comprising coupling a cap being attached to a mouth or neck of the container to apply said pressure.

11. The method according to claim 10, wherein the container comprise a plurality of containers, and the cap placed on each container is connected to a common pressure control.

12. The method according to claim 6, wherein said aromatized fluids are at controlled one of temperature and humidity.

13. The method according to claim 1, wherein the stopper is made of cork or a synthetic material and is prepared to provide the interaction between the surrounding closed environment and the inside of the container.

14. The method according to claim 1, further comprising arranging the container in a determined selectable orientation and maintaining said orientation for a predetermined time period under controlled conditions of pressurization following the profile.

15. The method according to claim 1, further comprising, after a determined evolution of the alcoholic beverage, by the application of at least one controlled pressurization, sealing the container prevents the interaction between the surrounding closed environment and the inside of the container.

16. The method according to claim 15, wherein said sealing comprises applying a gas-impervious capsule covering the stopper of the container.

* * * * *